Patented Nov. 2, 1937

2,097,750

UNITED STATES PATENT OFFICE 2,097,750

SYNTHESIS OF ALKYL HALIDES

Herrick R. Arnold, Elmhurst, and Edward T. Lessig, Wilmington, Del., assignors to E. I. du Pont de Nemours & Company, Wilmington, Del., a corporation of Delaware No Drawing. Application February 21, 1931, Serial No. 517,630

13 Claims. (Cl. 260—166)

This invention relates to a process for the synthesis of alkyl halides. More particularly, the invention relates to a process for the synthesis of alkyl chlorides wherein hydrogen chloride is caused to react with olefines in the vapor phase and in the presence of a catalyst.

There are two general methods for the synthesis of alkyl halides: (1) An alcohol may be caused to react with a halogen acid with the formation of the corresponding alkyl halide and water, or (2) a hydrogen halide may be caused to combine with an unsaturated hydrocarbon. In operating the alcohol process, it is common practice to direct a mixture of the halogen acid and alcohol vapor in suitable proportions through or over a liquid bath comprising a fusion or solution of a metallic halide heated to such a temperature that the water formed in the reaction escapes continuously from the catalyst together with the alkyl halide. For example, in the synthesis of ethyl chloride, ethanol and hydrochloric acid are passed through a heated bath of zinc chloride or ferric chloride. Alternatively, the use of a solid catalyst at a higher temperature has been suggested.

Several methods have been proposed for carrying out the other process, using unsaturated hydrocarbons as the source of carbon compounds. Taking the synthesis of ethyl chloride as typical of the whole class of alkyl halides, according to one method it is proposed to compress a mixture of dry hydrogen chloride and ethylene into a pressure resisting vessel containing anhydrous metallic chlorides such as ferric chloride or aluminum chloride as catalysts. The formation of hydrocarbon polymers is prevented by confining the temperature to values below 10° C. In various modifications of this process the reaction vessel may contain an absorbent material such as active charcoal, or the catalyst may be dissolved in an inert solvent, such as a portion of the ethyl chloride remaining from a previous run.

Another method of carrying out the direct synthesis from olefines consists of passing a mixture of ethylene and dry hydrogen chloride in the vapor phase over a solid catalyst at temperatures between 100° and 250° C. at ordinary or slightly elevated pressures. As catalysts for this process ferric chloride and aluminum chloride have been mentioned. Special reference has also been made by one investigator to the use of chlorides of elements of the fifth group of the Periodic Table, suitable examples being the chlorides of antimony, arsenic, or bismuth.

In general the ease of synthesis of alkyl halides from olefines is dependent on the molecular weights of the hydrocarbons and the hydrogen halides. Thus, in passing from iodides through bromides to chlorides the reaction becomes progressively more difficult. Likewise, olefines containing several carbon atoms react much more readily than those of a lower order. The direct synthesis of ethyl chloride from ethylene and hydrogen chloride, while differing from the synthesis of other alkyl halides in degree only, presents the maximum of difficulties.

Each of the existing processes have their disadvantages. The alcohol process evolves water which contributes to the corrosive action of the acid and makes necessary the most exacting equipment requirements. Alcohol is a relatively expensive raw material, moreover, a portion of it is lost through side reactions in which ethylene and ether are formed.

Industrial gases containing large proportions of olefines are readily available at low cost, favoring application of the direct addition method. If the process is carried out by the pressure-pot method, it must necessarily be conducted as a batch operation, with provision for recovering the catalyst, which is both expensive and cumbersome.

The chief fault with the vapor phase process using ethylene and hydrogen chloride as thus far carried out results from a very rapid decrease in the equilibrium conversion as the temperature is increased above 100° C. In order to obtain suitable conversions at the necessarily low temperatures, exceedingly active catalysts must be found. Such catalysts as have thus far been proposed are quite volatile and are rapidly carried out of the reaction chamber. Another cause of rapid catalyst deterioration has been explained on the basis of the capacity of such compounds as aluminum and ferric chlorides to form relatively stable complex compounds with olefines.

This invention therefore has as an object to overcome the above mentioned prior art difficulties and to provide an improved process for carrying out the direct synthesis of alkyl halides in the vapor phase. Another object is to provide a catalytic vapor phase process wherein a high yield of alkyl halides is obtained at either high or low pressure of reacting gases. A specific object of the invention is to provide an improved process for the direct synthesis of ethyl chloride from ethylene and hydrogen chloride. Other objects will appear hereinafter.

These objects are accomplished by the following invention which in its general aspects comprises bringing a gaseous olefine and a hydrogen halide into contact with highly efficient catalysts carried upon a porous supporting material. The gaseous reactants may be under either atmospheric or superatmospheric pressure, while the temperature may range from 100° to 250° C. We have found that the chlorides of metals occurring in the second group of the Periodic Table, particularly those of the sub-group containing zinc, are far superior to those previously recommended. The metals of this sub-group, namely, beryllium, magnesium, zinc, cadmium and mercury, have in addition to their similar catalytic properties other marked chemical similarities.

The catalytic activity of the above mentioned chlorides is fully developed only when the said chlorides are used in a form presenting an expansive surface to the reactive gas mixture. Such a physical form is achieved by the use of supporting materials having a very high molecular porosity, such as is known to exist in silica gel, active charcoal and some of the naturally occurring highly porous earthy materials.

In its specific embodiment our invention comprises preparing a catalyst by depositing a chloride of a metal of the group including zinc on a highly porous support and passing over the catalyst at 100° to 250° C. a gaseous mixture comprising ethylene and hydrogen chloride. The ethyl chloride formed is separated from the effluent gases by refrigeration, absorption, or any other suitable means and the unchanged raw materials are recovered for repassing over the catalyst.

In the following examples we have set forth several of the preferred embodiments of our invention, but they are presented only for purposes of illustration and not as a limitation.

*Example 1*

A high grade commercial activated charcoal, having an absorption rating of 60 minutes by the standard absorption test, was treated with nitric and hydrochloric acids in order to reduce the ash content to 0.4%. Two hundred cc. of this purified active charcoal weighing 80 g. was heated at 400° C. for 4 hours in a 15 mm. vacuum. After cooling in vacuo, the charcoal was covered with a solution prepared by dissolving 40 g. of anhydrous zinc chloride in 200 cc. of water. After allowing the charcoal to soak for several hours it was drained and dried at 110° C. In order to build up the concentration of zinc chloride, the impregnating process was repeated exactly as before, starting with the outgassing of the once-impregnated catalyst. After the second treatment the dry catalyst contained about 13% zinc and about 14% chlorine.

One hundred and fifty cc. of this catalyst was placed in an electrically heated tube furnace. At a temperature of 150° C. a mixture of equal volumes of ethylene and hydrogen chloride was passed over the catalyst at atmospheric pressure at the rate of six liters per hour. There was a pronounced temperature rise in the catalyst bed and the initial conversion of the reacting gases to ethyl chloride was about 91%. For a period of about 110 hours of continuous operation the conversion was maintained above 84%.

*Example 2*

In another experiment, the zinc chloride on charcoal catalyst described in Example 1, was tested at a much higher rate of flow. At a temperature of 175° C. the equimolecular mixture of ethylene and hydrogen chloride was passed over the catalyst at the rate of 300 cc. of gas per cc. of catalyst per hour. Under these conditions the initial conversion was about 70%, falling steadily to about 20% after 200 hours of continuous use. At this time the rate of deterioration had become extremely slow. However, if a temperature of 250° C. is used with all other conditions the same, a conversion of about 40% may be maintained without rapid catalyst deterioration.

*Example 3*

A catalyst comprising magnesium chloride supported on charcoal was prepared by outgassing active charcoal and doubly impregnating it with 20% solutions of magnesium chloride as described for the zinc chloride-charcoal catalyst in Example 1. The finished catalyst contained 3.8% magnesium. When tested under the conditions of Example 2, it gave a conversion of ethylene and hydrogen chloride to ethyl chloride amounting to about 25%. Similar catalysts prepared by impregnating active charcoal with beryllium chloride and with mercuric chloride, each gave conversions of about 4% under the same conditions of operation.

*Example 4*

A catalyst prepared by supporting zinc chloride on silica gel, and containing by analysis 11% of zinc, was employed for the synthesis of ethyl chloride. At an ethylene space velocity of 150, a gas ratio of 1, and a temperature of 170° C., the conversion was about 23% and remained unchanged after 38 hours.

In another modification of this example, an absorbent siliceous material prepared by extracting a naturally occurring aluminum silicate known as Indianaite with acid, was employed as a catalyst support for zinc chloride. This catalyst, containing 9.5% of zinc likewise gave an initial conversion of 23% when tested under the conditions described above for the catalyst prepared from artificial silica gel, but deteriorated rapidly to 15%.

*Example 5*

A gas mixture containing two parts by volume of propylene to one part of hydrogen chloride was passed over 50 cc. of zinc chloride-on-charcoal catalyst containing 9.5% zinc at a temperature of 150° and atmospheric pressure at the rate of about 10 liters per hour. Over 75% of the hydrogen chloride was caused to add smoothly to the propylene with the formation of isopropyl chloride. The warm exit gases were scrubbed with water to remove unchanged acid after which the isopropyl chloride was condensed out by cooling and the excess propylene was returned to the process for reuse.

*Example 6*

A catalyst consisting of cadmium chloride on charcoal was prepared by heating activated charcoal in a vacuum, cooling and impregnating with a solution of cadmium chloride. By repeating the process several times, the concentration of the salt in the charcoal was built up to a value corresponding to 17.4% of cadmium metal.

Fifty cc. of this catalyst was used for the synthesis of ethyl chloride from ethylene and hydrogen chloride. At a temperature of 175° C., atmospheric pressure, a gas ratio of about 1, and a space velocity of about 300 cc. of gas mixture per cc. of catalyst per hour, the initial conversion was about 60%.

*Example 7*

The zinc chloride-on-charcoal catalyst described in Example 1, was employed for the synthesis of ethyl chloride from ethylene and hydrogen chloride at pressures in excess of atmospheric pressure. Ten cc. of the catalyst was enclosed in a pressure resisting tube which was heated to 210° C. in an oil bath. At this temperature an equimolecular mixture of the two gases was passed through the catalyst tube under a pressure of about 17 atmospheres and at the rate of about 3 liters per hour as measured at ordinary conditions of temperature and pressure. A sustained conversion of about 84% was maintained throughout the 24 hours the experiment was in progress.

*Example 8*

A catalyst was prepared as follows: 40 grams of zinc bromide was dissolved in 100 cc. of water and 100 cc. of a high grade commercial activated charcoal, such as described in Example 1 above, was added to the solution and after stirring vigorously was allowed to stand for about 10 hours. The catalytic material thus obtained was drained free from liquid, dried at 110° C., and found upon analysis to contain 10.1% zinc.

At the temperature of 175° C. an equimolecular mixture of ethylene and hydrogen chloride was passed over the catalyst at the rate of 300 cc. of gas per cc. of catalyst per hour. Under these conditions there was obtained an initial conversion of about 21%.

*Example 9*

A catalyst composition was prepared as follows: 30 grams of zinc chloride was dissolved in 100 cc. of water with the aid of 40 cc. of 28% hydrofluoric acid. 100 cc. of a high grade commercial activated charcoal, such as described in Example 1 above, was added, the mixture stirred vigorously and allowed to stand for about 10 hours. Upon draining off the supernatant liquid and drying at 110° C., the composition was found upon analysis to have a zinc content of 6.7%.

At a temperature of 175° C. an equimolecular mixture of ethylene and hydrogen chloride was passed over the catalyst at the rate of 300 cc. of gas per cc. of catalyst per hour. Under these conditions, an initial conversion of 60% was obtained.

The halides of the group 2 metals which have been found so efficacious for the synthesis of alkyl halides may be used singly or in admixture with each other or other compounds. Preferably they are employed in the form of supported catalysts wherein a material of high porosity is employed as the supporting medium. Active charcoal, silica gel, or naturally occurring adsorbent minerals have been found to function as supports but active charcoal is preferred on account of its larger capacity for holding the active catalyst.

In selecting an active charcoal to be used for the catalyst support, the choice of one having a high absorption capacity is a favorable factor in the production of a catalyst having a high concentration of active catalytic material with a minimum loss of porosity. Low grade charcoals have been found to have a low capacity for metallic chlorides and yield catalysts of low initial activity.

In preparing the supported catalysts the chlorides or other halides of the metals may be used, or compounds which may be readily converted into the halides in the presence of the halogen acid contained in the reactive gas mixture.

Although we prefer to impregnate the porous supports with metallic halides directly, an alternative procedure is to impregnate them instead with the oxides or hydroxides of the metals, which on exposure to the reacting gases are converted at once to active metallic halide catalysts.

The specific method used for impregnating the supporting material is of minor importance. Any method may be used that will build up a high concentration of the catalytic material with a uniform distribution throughout the entire mass, and with as little plugging of the pores as possible. We have found that good results are obtained by using the vacuum impregnation method described in the copending application of H. R. Arnold and W. A. Lazier, Serial No. 470,219, filed July 23, 1930. When used as described in Example 1, the introduction of about 30% of zinc chloride into the charcoal causes a loss of absorptive capacity of only about 50%. The method may only be necessary, however, when the very highest activity attainable is desired. A good catalyst may be obtained simply by boiling the charcoal or other support with a solution of the chosen metallic halide.

As already outlined we may use as catalysts for alkyl chloride synthesis the chlorides of zinc, cadmium, mercury, magnesium or beryllium. We regard these as equivalents in kind but not in degree. While all will give high yields of alkyl chlorides from olefines and hydrogen chloride at low rates of flow, cadmium chloride and especially zinc chloride are the more active, permitting the attainment of high conversions at much higher rates of flow.

The concentration of the salt contained within and upon the support is an important factor determining the activity of the catalyst. For example, a cadmium chloride on charcoal catalyst containing 4.5% of cadmium when used in ethyl chloride synthesis gave a conversion of only 11% while under the same conditions another catalyst containing 17.4% of cadmium gave a conversion of 60%.

The concentration of the catalyst that may be used is in turn a function of the capacity of the catalyst support. For example, charcoal will hold more zinc chloride in an active condition than silica gel. Owing to the wide range of molecular weights of the various metallic halides which may be used as catalysts according to the present invention it is unnecessary to set limits of concentration that will be general for all the various compounds. However, in preparing catalysts for ethyl chloride or isopropyl chloride synthesis we prefer to impregnate active charcoal with from 10 to 40% of zinc chloride or cadmium chloride.

The catalysts of the present invention may be used in a wide variety of process modifications. Alkyl halides may be synthesized from olefines and hydrogen halides at ordinary, reduced or superatmospheric pressure. The operative temperatures will depend on the particular reaction system used. For ethyl chloride synthesis temperatures of from 50° to 250° C. may be used depending somewhat on the operating pressure.

The process is ordinarily carried out in the vapor phase. At atmospheric pressure, a temperature of about 175° C. is preferred. The ratio of hydrogen halide to olefine in the reacting gases is relatively unimportant. A ratio of about 1 is convenient, but other ratios may be selected, depending on the relative costs of the raw materials and the methods used for recovering the product and unreacted gases.

The rate of flow is determined by the activity of the catalyst and the degree of conversion desired. The maximum space velocity that will give nearly the equilibrium conversion is different for each reaction system and each catalyst. It is also markedly increased by application of pressure.

The reacting gases need not be of high purity, provided specific catalyst poisons are not present. Inert gases or vapors have only the slight effect expected from a lowering of the partial pressure of the reactive gases.

In order to gain a better understanding of the fundamental problem involved in the synthesis of ethyl chloride from ethylene and hydrogen chloride, an experimental study has been made of the temperature-equilibrium relationship. From a series of experiments made at very low rates of flow it has been found that the maximum concentration of ethyl chloride attainable at equilibrium for various temperatures is as follows:

| Temperature °C. | Per cent conversion at equilibrium |
|---|---|
| 100 | 95 |
| 150 | 89 |
| 200 | 70 |
| 250 | 40 |

From the above data, the heat of reaction may be shown to be about 13.6 cal. per mol. When equilibrium conversion is being attained the yield per pass is determined by the temperature at the exit of catalyst mass.

In a large measure, the present invention has succeeded in overcoming the several difficulties involved in the synthesis of alkyl halides, particularly ethyl chloride. Higher conversions have been obtained at higher space velocities than those previously employed in prior art processes, resulting in better life performances of the catalysts, particularly when used at the lower space velocities of the prior art. The catalysts of the present invention are relatively cheap to prepare, are less volatile than many of the prior art catalysts and have a lesser tendency to form polymeric and complex reaction products with olefines.

The present invention may be applied to the addition of hydrogen halides to ethylene, propylene or their homologues or to acetylene or vinyl derivatives or their homologues. It is of special value for the synthesis of ethyl chloride.

As many apparent and widely different embodiments of this invention may be made without departing from the spirit thereof, it is to be understood that we do not limit ourselves to the foregoing examples or description except as indicated in the following claims.

We claim:
1. In the process of preparing an alkyl halide, the step which comprises bringing a gaseous mixture of an olefine hydrocarbon and a hydrogen halide into contact with a catalyst comprising essentially a halide of a metal of Group II, Sub-group B, of the Periodic Table.
2. In the process of preparing an alkyl halide, the step which comprises bringing a gaseous mixture of an olefine hydrocarbon and a hydrogen halide into contact with a catalyst comprising essentially a halide of a metal of Group II, Sub-group B, of the Periodic Table supported on activated carbon.
3. In the process of preparing an alkyl halide, the step which comprises bringing a gaseous mixture of an olefine hydrocarbon and a hydrogen halide into contact with zinc chloride.
4. The process described in claim 1 in which the temperature is maintained at 100° to 250° C.
5. The process described in claim 1 in which the temperature is maintained at 100° to 250° C., and the pressure is maintained at 1 to 17 atmospheres.
6. In the process of preparing ethyl chloride, the step which comprises passing a mixture of ethylene and hydrogen chloride in the vapor phase over a catalyst comprising essentially zinc chloride.
7. In the process of preparing ethyl chloride, the step which comprises passing a mixture of ethylene and hydrogen chloride in the vapor phase over a catalyst comprising essentially zinc chloride supported on activated carbon.
8. The process of claim 6 in which the temperature is maintained at 100° to 250° C., and the pressure at 1 to 17 atmospheres.
9. In the process of preparing isopropyl chloride, the step which comprises bringing a gaseous mixture of propylene and hydrogen chloride into contact with a catalyst consisting of zinc chloride supported on activated carbon.
10. The process of claim 9 in which the temperature is maintained at 100° to 250° C.
11. In the process of preparing an aliphatic halide, the step which comprises bringing a gaseous mixture of an olefine hydrocarbon and hydrogen chloride into contact with a halide of a metal of Group II, Sub-group B, of the Periodic Table supported upon a material of the group consisting of activated carbon and silica gel.
12. In the process of preparing an aliphatic halide, the step which comprises bringing a gaseous mixture of an olefine hydrocarbon and hydrogen chloride into contact with zinc chloride supported upon a material of the group consisting of activated carbon and silica gel.
13. In the process of preparing an aliphatic halide, the step which comprises bringing a gaseous mixture of an olefine hydrocarbon and hydrogen chloride into contact with cadmium chloride supported upon a material of the group consisting of activated carbon and silica gel.

HERRICK R. ARNOLD.
EDWARD T. LESSIG.